(12) United States Patent
Satake

(10) Patent No.: US 9,519,347 B2
(45) Date of Patent: Dec. 13, 2016

(54) TACTILE SENSATION PROVIDING DEVICE

(71) Applicant: KYOCERA CORPORATION, Kyoto-shi, Kyoto (JP)

(72) Inventor: Masaomi Satake, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 102 days.

(21) Appl. No.: 14/354,164

(22) PCT Filed: Oct. 26, 2012

(86) PCT No.: PCT/JP2012/006878
§ 371 (c)(1),
(2) Date: Apr. 25, 2014

(87) PCT Pub. No.: WO2013/061605
PCT Pub. Date: May 2, 2013

(65) Prior Publication Data
US 2014/0320440 A1     Oct. 30, 2014

(30) Foreign Application Priority Data

Oct. 27, 2011 (JP) ................. 2011-236414

(51) Int. Cl.
G06F 3/00 (2006.01)
G06F 3/01 (2006.01)
G06F 3/0488 (2013.01)
G06F 3/041 (2006.01)
G06F 1/00 (2006.01)

(52) U.S. Cl.
CPC ............. *G06F 3/016* (2013.01); *G06F 1/00* (2013.01); *G06F 3/041* (2013.01); *G06F 3/0412* (2013.01); *G06F 3/0414* (2013.01); *G06F 3/0416* (2013.01); *G06F 3/0488* (2013.01)

(58) Field of Classification Search
CPC .................................. G06F 3/041; G09G 5/00
See application file for complete search history.

(56) References Cited

U.S. PATENT DOCUMENTS

2003/0174121 A1    9/2003  Poupyrev et al.
2012/0274574 A1*  11/2012  Aono ................... G06F 3/04886
                                                                  345/173

FOREIGN PATENT DOCUMENTS

JP        2003288158 A       10/2003
JP        2008130055 A        6/2008
JP        2011187087 A        9/2011
JP    WO 2011128959 A1  *   10/2011   ........... G06F 1/1626
(Continued)

OTHER PUBLICATIONS

ISR for PCT/JP2012/006878 mailed Jan. 15, 2013.

*Primary Examiner* — Michael Faragalla
(74) *Attorney, Agent, or Firm* — Hauptman Ham, LLP

(57) ABSTRACT

The tactile sensation providing device includes a touch sensor, tactile sensation providing unit that vibrates the touch face of the touch sensor, display unit, and control unit that controls the display unit to display an image and sets a tactile sensation provided by the tactile sensation providing unit for a pixel in the image, so that upon the touch sensor detecting contact at a position corresponding to the pixel, the control unit executes a predetermined process allocated to the pixel and controls the tactile sensation providing unit to provide the tactile sensation set for the pixel to a contacting object in contact with the touch face.

7 Claims, 9 Drawing Sheets

(56) References Cited

FOREIGN PATENT DOCUMENTS

WO      2009017125 A1    2/2009
WO      2011128959 A1    10/2011

\* cited by examiner

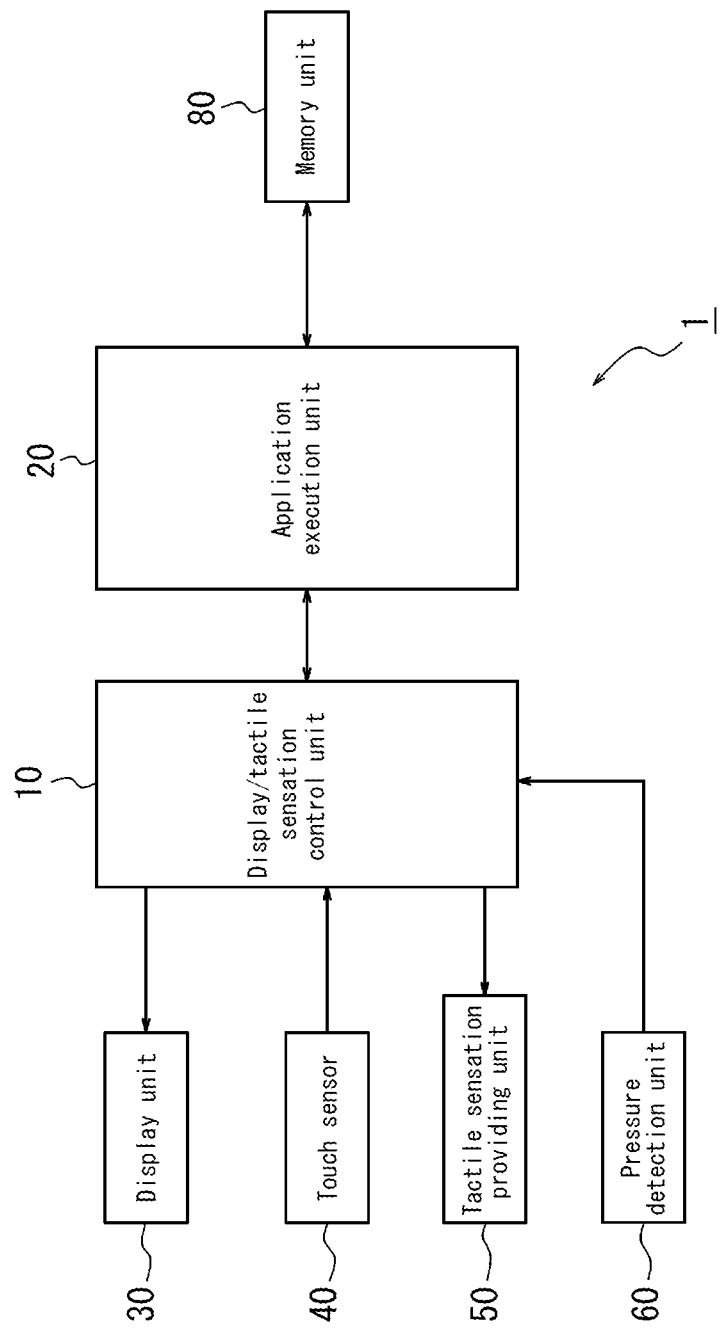

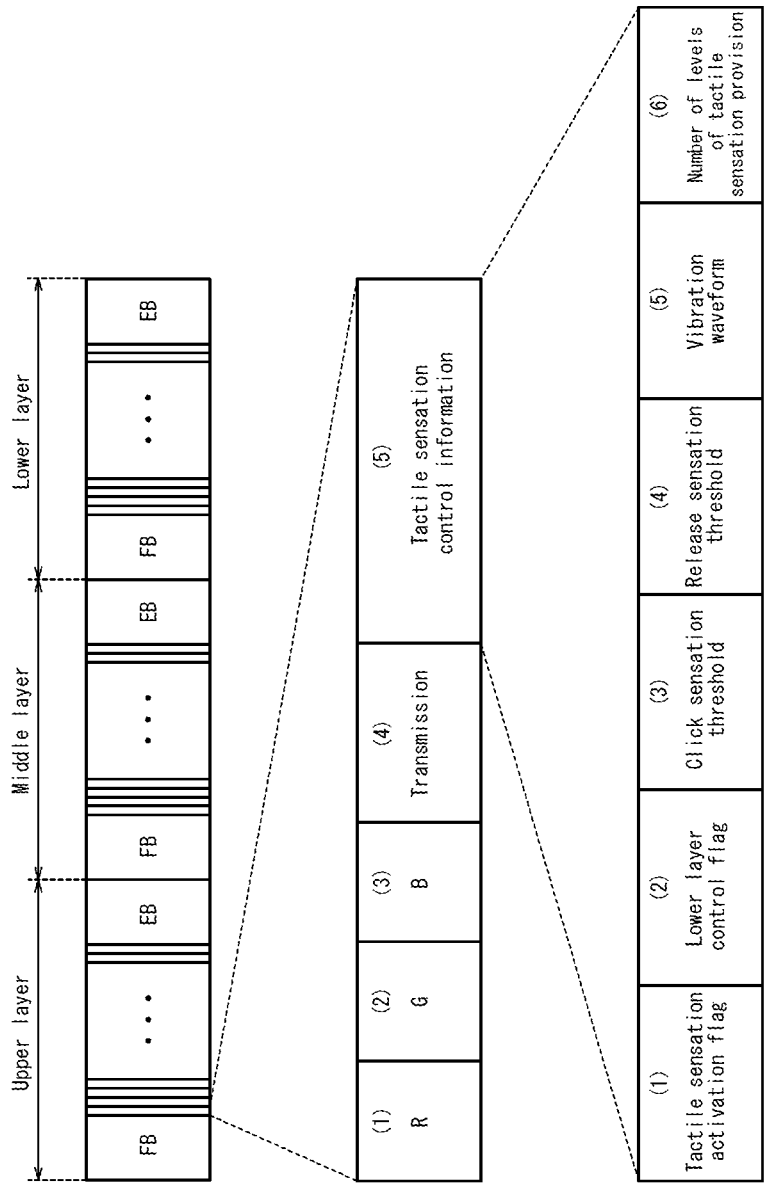

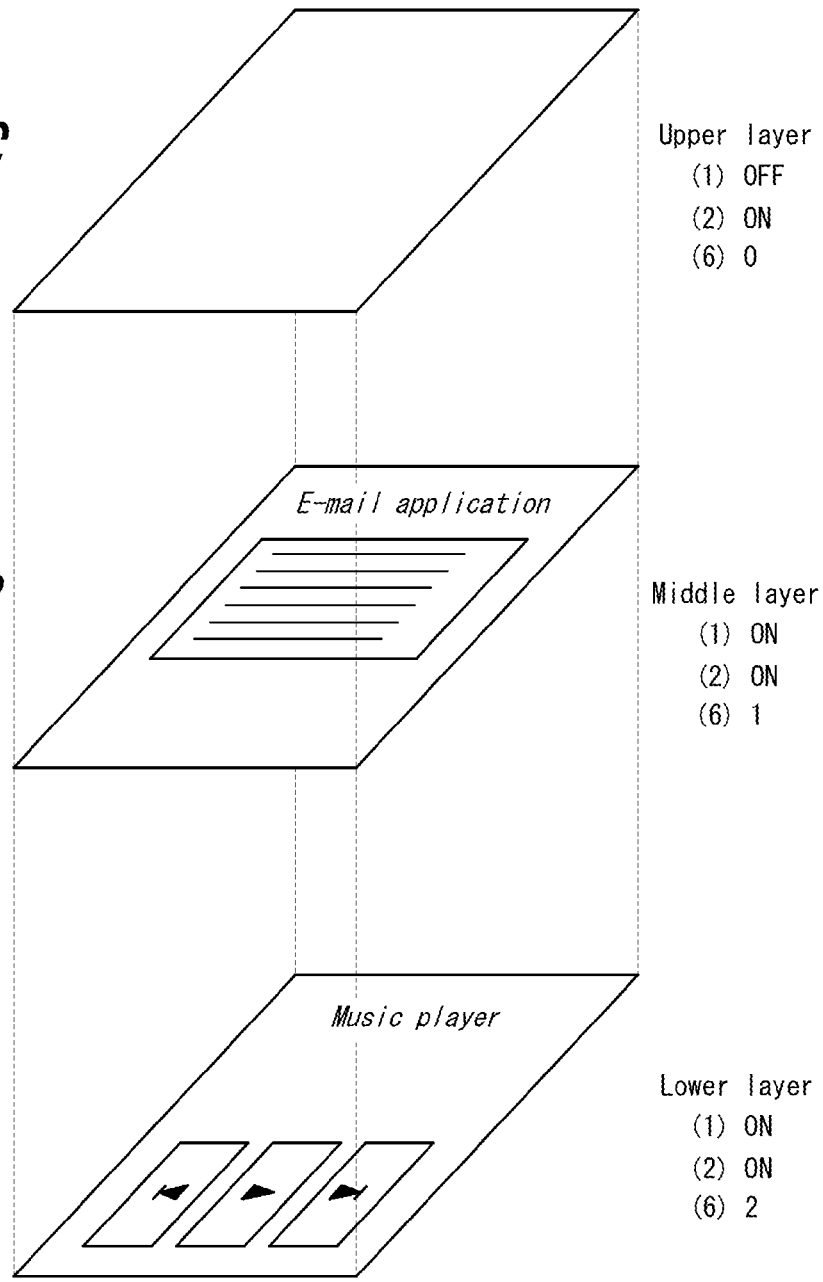

Upper layer
(1) ON
(2) ON
(6) 1

Middle layer
(1) ON
(2) OFF
(6) 1

Lower layer
(1) ON
(2) ON
(6) 2

Upper layer
(1) ON
(2) ON
(6) 1

Middle layer
(1) OFF
(2) ON
(6) 1

Lower layer
(1) ON
(2) ON
(6) 2

Upper layer
(1) ON
(2) OFF
(6) 1

Middle layer
(1) ON
(2) ON
(6) 1

Lower layer
(1) ON
(2) ON
(6) 2

TACTILE SENSATION PROVIDING DEVICE

CROSS-REFERENCE TO RELATED APPLICATION

This application is a National Phase of International Application Number PCT/JP2012/006878 filed Oct. 26, 2012 and claims priority to and the benefit of Japanese Patent Application No. 2011-236414 filed Oct. 27, 2011, the entire contents of which are incorporated herein by reference.

TECHNICAL FIELD

The present invention relates to a device for providing a tactile sensation. More particularly, the present invention relates to a device for providing a tactile sensation in accordance with a contact operation on a touch sensor.

BACKGROUND

In recent years, some mobile terminals such as cellular phones include a touch panel, touch switch, or other such touch sensor for an input device, such as an operation unit or switches, that detects an operation by a user. Input devices provided with a touch sensor are in wide use apart from mobile terminals as well, in information devices such as calculators or ticket vending machines, household appliances such as microwave ovens, televisions, or lighting appliances, industrial devices (factory automation equipment), and the like.

A variety of types of such touch sensors are known, such as a resistive film type, capacitive type, optical type, or the like. All of these types of touch sensors, however, simply detect contact by a finger, stylus pen, or the like. Upon being contacted, the touch sensor itself is not physically displaced like a push-button switch.

Accordingly, even if an operation by contact is recognized by the input device, the operator cannot receive any feedback for the operation. Therefore, the operator operating the touch sensor obtains no sense of operation such as that obtained when pushing a key or button constituted by a push-button switch. As a result, a problem exists in that the operator has no way of knowing that the contact operation has been properly recognized by the input device unless the input device starts a predetermined process in accordance with the contact on the touch sensor.

To address this problem, a method has been proposed to provide feedback that is neither auditory nor visual by vibrating the touch sensor upon the touch sensor detecting contact (for example, see Patent Literature 1 and Patent Literature 2).

CITATION LIST

Patent Literature 1: JP 2003-288158 A
Patent Literature 2: JP 2008-130055 A

SUMMARY

With the techniques disclosed in Patent Literature 1 and Patent Literature 2, when an operation on the touch sensor is detected, vibration can be generated at the operator's fingertip or the like. Accordingly, an operator performing an operation using such a device can confirm, via sense of touch, that the device has correctly recognized an operation performed on the touch sensor.

In devices providing feedback to an operator based on an operation, however, the provided feedback has been the same regardless of the position, on an object displayed on the display unit, at which the operator contacts the touch sensor. In other words, in a known device, no matter what position on the touch sensor the operator contacts, the feedback obtained in accordance with the contact has depended uniformly on the device. For example, in a known device, the same type of vibration is obtained regardless of the region, in the object displayed on the display unit, to which the position contacted by the operator on the touch sensor corresponds.

Furthermore, in a known device, it has not been possible to provide different feedback portion-by-portion, for example, in a touch sensor at positions corresponding to a region in which one object is displayed as an image. For example, in a known device, it has been difficult to make a setting for flexible feedback such as providing feedback suggesting that the detected contact was at an edge portion only when contact on the touch sensor is detected at a position corresponding to an edge portion of an object. In such a device, the tactile sensation provided in accordance with contact on the touch panel cannot be set with a high degree of freedom in correspondence with an image displayed on the display unit.

The present invention has been conceived in light of the above circumstances and provides a tactile sensation providing device that can set a tactile sensation provided in accordance with contact on a touch panel with a high degree of freedom in correspondence with an image displayed on the display unit.

Accordingly, a tactile sensation providing device according to a first aspect of the present invention includes a touch sensor; a tactile sensation providing unit configured to vibrate a touch face of the touch sensor; a display unit; and a control unit configured to control the display unit to display an image, such that the control unit is further configured to perform control to set a tactile sensation provided by the tactile sensation providing unit for a pixel in the image, so that upon the touch sensor detecting contact at a position corresponding to the pixel, the control unit executes a predetermined process allocated to the pixel and controls the tactile sensation providing unit to provide the tactile sensation set for the pixel to a contacting object in contact with the touch face.

A second aspect of the present invention is the tactile sensation providing device according to the first aspect, such that in accordance with a state of the contact detected by the touch sensor, the control unit distinguishes between execution of a plurality of predetermined processes allocated to the pixel.

A third aspect of the present invention is the tactile sensation providing device according to the first aspect, further including a pressure detection unit configured to detect pressure on the touch face, such that the control unit performs control to set a predetermined standard for the tactile sensation providing unit to provide a tactile sensation for the pixel, and while the touch sensor detects contact at a position corresponding to the pixel, when data based on pressure detected by the pressure detection unit satisfies the standard, the control unit executes the predetermined process allocated to the pixel and controls the tactile sensation providing unit to provide the tactile sensation set for the pixel.

A fourth aspect of the present invention is the tactile sensation providing device according to the third aspect, such that the control unit performs control to set the predetermined standard for the tactile sensation providing unit to provide the tactile sensation for the pixel at a plurality of levels, and while the touch sensor detects contact at a position corresponding to the pixel, when data based on pressure detected by the pressure detection unit satisfies one of the plurality of levels of the standard, the control unit distinguishes, in accordance with the one of the plurality of levels of the standard that is satisfied, between execution of a plurality of predetermined processes allocated to the pixel.

A fifth aspect of the present invention is the tactile sensation providing device according to the first aspect, such that when the display unit displays an image across a plurality of layers, the control unit sets, for a pixel in one layer among the plurality of layers, provision of a tactile sensation set for a lower layer than the one layer to be valid or invalid.

A sixth aspect of the present invention is the tactile sensation providing device according to the first aspect, such that when the display unit displays an image across a plurality of layers, the control unit, in accordance with a state of the contact detected by the touch sensor, determines which layer, among the plurality of layers, contains the pixel to which the position of the contact corresponds.

A seventh aspect of the present invention is the tactile sensation providing device according to the first aspect, further including a pressure detection unit configured to detect pressure on the touch face, such that when the display unit displays an image across a plurality of layers, the control unit, in accordance with data based on pressure detected by the pressure detection unit, determines which layer, among the plurality of layers, contains the pixel to which the position of the contact corresponds.

An eighth aspect of the present invention is the tactile sensation providing device according to the first aspect, such that based on occurrence of a predetermined event, the control unit controls the display unit to change the image that is displayed and performs control to set the tactile sensation provided by the tactile sensation providing unit for the pixel in the image.

According to the present invention, the tactile sensation provided in accordance with contact on a touch panel can be set with an extremely high degree of freedom in correspondence with an image displayed on the display unit.

BRIEF DESCRIPTION OF DRAWINGS

The present invention will be further described below with reference to the accompanying drawings, wherein:

FIG. 1 is a block diagram schematically illustrating the configuration of a tactile sensation providing device according to an embodiment of the present invention;

FIG. 3 illustrates the configuration of display data to which has been added tactile sensation control information according to an embodiment of the present invention;

FIG. 5 illustrates an example of operations by the tactile sensation providing device according to an embodiment of the present invention;

DESCRIPTION OF EMBODIMENTS

Figure 2A:
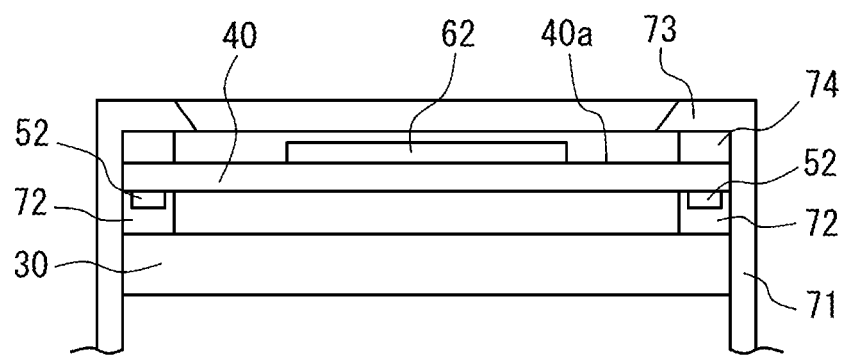
FIG. 2 illustrates an exemplary housing structure for the tactile sensation providing device according to an embodiment of the present invention.

The following describes an embodiment of the present invention with reference to the drawings.

FIG. 1 is a block diagram schematically illustrating the configuration of a tactile sensation providing device according to an embodiment of the present invention.

As illustrated in FIG. 1, a tactile sensation providing device 1 includes a display/tactile sensation control unit 10, an application execution unit 20, a display unit 30, a touch sensor 40, a tactile sensation providing unit 50, a pressure detection unit 60, and a memory unit 80.

The memory unit 80 can, for example, be configured using NAND-type flash memory, RAM, or the like. Memory areas of the memory unit 80 include an area storing various application software (referred to below simply as an "application"), as well as an area storing resources for display, such as objects, image files, and the like. As described below, tactile sensation control information is added to the data of the resources for display provided by the memory unit 80.

The application execution unit 20, which can be configured using a processor, such as a CPU, reads a designated one of a variety of applications from the memory unit 80, executes a process based on the application, and controls the functional units based on the application.

The display unit 30 displays a background image or the like and displays an image for an object such as a button or key (collectively referred to below simply as "key or the like"). This object is an image that suggests, to the operator, a region or position to be contacted. Such image data is provided from the display/tactile sensation control unit 10 via control by the application execution unit 20. The display unit 30 is, for example, configured using a liquid crystal display panel (LCD), an organic EL display panel, or the like.

The touch sensor 40 is normally provided on the front face of the display unit 30 and detects, at a corresponding position on a touch face, contact (or release of contact) by the operator's finger or the like (contacting object) on an object displayed on the display unit 30. The touch sensor 40 also detects the position of contact on the touch face and notifies the display/tactile sensation control unit 10 of the detected position of contact. The touch sensor 40 can, for example, be a resistive film type, a capacitive type, an optical type, or the like.

The tactile sensation providing unit 50 is, for example, configured using a piezoelectric vibrator or the like and generates vibration on the touch face of the touch sensor 40 with a predetermined vibration pattern. By generating vibration on the touch face of the touch sensor 40, the tactile sensation providing unit 50 provides a tactile sensation to the contacting object in contact with the touch face. Furthermore, the tactile sensation providing unit 50 can be configured to vibrate the touch face of the touch sensor 40 indirectly by transmitting, to the tactile sensation providing device 1, vibration via a vibration motor (eccentric motor) or the like.

The pressure detection unit 60 detects pressure on the touch face of the touch sensor 40 when the user performs an operation and is, for example, configured using a device or the like such as a strain gauge sensor, a piezoelectric element, or the like that experiences a change in physical or electrical characteristics (strain, resistance, voltage, or the like) in response to pressure. When the pressure detection unit 60 is configured using a piezoelectric element, for example, the magnitude of the voltage (voltage value (referred to below as data based on pressure)), which is an electrical characteristic, of the piezoelectric element changes in accordance with the magnitude of the load (force) of the pressure on the touch sensor 40 (or the speed at which the magnitude of the load (force) changes (acceleration)). In this case, the below-described display/tactile sensation control unit 10 acquires the data based on pressure by the pressure detection unit 60 notifying the display/tactile sensation control unit 10 of the data based on pressure, or by the display/tactile sensation control unit 10 detecting data based on pressure of the pressure detection unit 60. In other words, the display/tactile sensation control unit 10 acquires data based on pressure on the touch sensor 40 from the pressure detection unit 60. Note that instead of a voltage value, the data based on pressure may be power, resistance, magnitude of the load, or the like related to the pressure. Upon being notified by the display/tactile sensation control unit 10 that data based on pressure on the touch face of the touch sensor 40 is at least a predetermined threshold, the application execution unit 20 performs control to execute a predetermined process based, for example, on an application.

Note that the pressure detection unit 60 may measure the change in the gap between the touch sensor 40 and the display unit 30 occurring when the user presses the touch sensor 40. In this case, the data based on pressure corresponds to the value of the change in the gap. Alternatively, the pressure detection unit 60 may measure the change in the gap between the touch sensor 40 and another component, such as a circuit board.

Furthermore, the pressure detection unit 60 can be configured in accordance with the contact detection type of the touch sensor 40. For example, if the touch sensor 40 is a resistive film type, a configuration without a strain gauge sensor, piezoelectric element, or the like may be adopted by associating the magnitude of the resistance that corresponds to the size of the contact area with the load (force) of the pressure on the touch face of the touch sensor 40. Alternatively, if the touch sensor 40 is a capacitive type, a configuration without a strain gauge sensor, a piezoelectric element, or the like may be adopted by associating the magnitude of the capacitance with the load (force) of the pressure on the touch sensor 40.

By vibrating the tactile sensation providing unit in response to pressure detected by the pressure detection unit 60 (pressure on the touch panel), the above-described tactile sensation providing unit 50 can generate vibration and provide a tactile sensation to the user's finger or the like, thereby providing the user pressing the touch sensor 40 with a sensory understanding that an operation has been performed. The pressure detection unit 60 may be configured integrally with the tactile sensation providing unit 50. In greater detail, when the pressure detection unit 60 and the tactile sensation providing unit 50 are both configured using a piezoelectric element, these units may be configured to share a common piezoelectric element as a pressure detection and tactile sensation providing unit. The reason is that a piezoelectric element generates voltage when pressure is applied and deforms upon application of voltage.

The tactile sensation providing unit 50 can also be configured to generate vibration by driving a piezoelectric element that also serves as the pressure detection unit 60 when the magnitude of the voltage (voltage value (data)) of the piezoelectric element satisfies a predetermined threshold (when the contact detection unit 40 is pressed). Stating that the magnitude of the voltage (voltage value (data)) of the piezoelectric element satisfies a predetermined standard may refer to the voltage value (data) reaching a predetermined standard, to the voltage value (data) exceeding a predetermined standard, or to detection of a voltage value (data) equivalent to a predetermined standard.

The display/tactile sensation control unit 10, which can be configured using a processor, such as a CPU, performs control pertaining to display in the display unit 30 based on a display instruction from the application execution unit 20, such as displaying a background image, an image for an object, or the like on the display unit 30, or changing the display of the object. When issuing a display instruction to the display/tactile sensation control unit 10, the application execution unit 20 can read image data stored in the memory unit 80, such as display data for the image to display on the display unit 30. The display/tactile sensation control unit 10 receives provision of image data thus read from the memory unit 80 and performs control so that a predetermined image is rendered at a predetermined position on the display unit 30. Furthermore, the display/tactile sensation control unit 10 can control the display unit 30 to display the image across a plurality of layers.

In this context, layer display refers to displaying an image on the display unit as a combined image by superimposing a plurality of virtual layers. For example, for superimposed display by layers of an image with a transmittance of 0% (i.e. an image that does not transmit light), only the uppermost layer of the image, among the layers across which the image is displayed in the display unit, is actually displayed, whereas the lower layers of the image are not displayed at the superimposed location. On the other hand, for superimposed display by layers of an image with a transmittance other than 0% (i.e. an image that transmits light), the uppermost layer of the image, among the layers across which the image is displayed in the display unit, transmits the lower layers of the image, which are also displayed.

Note that in layer display, the multiple hierarchical structures are merely virtual, and only one image is actually displayed on the display unit. Therefore, when objects are displayed across layers, even if an attempt is made to provide a tactile sensation via the touch sensor detecting contact at a position corresponding to a region of an object displayed on the display unit, it cannot be determined which layer includes the object to which the input by the contact corresponds.

In particular when displaying objects via an image with a transmittance of 0%, one approach might be for the touch sensor to detect contact at a position corresponding to a region of the object displayed in the uppermost layer among the plurality of layers across which the image is displayed. In this way, however, when only considering the object displayed in the uppermost layer among the layers in which the image is displayed, the component executing an application program always needs to recognize the object displayed in the uppermost layer among the layers in which the image is displayed in the display unit.

Furthermore, in this way, when only considering the object displayed in the uppermost layer among the layers in which the image is displayed, if a plurality of objects are displayed superimposed at the same position in a plurality of layers, contact on an object displayed in a layer other than the uppermost layer cannot be detected. In particular, when adopting a touch panel in a small terminal device such as a cellular phone, both the display unit and the touch sensor are necessarily small.

When the location the operator is to contact is displayed in the display unit of such a small device, it is assumed that the degree of freedom will be severely restricted when setting feedback provided in accordance with contact on the touch sensor at a position corresponding to an object.

According to the tactile sensation providing device 1 of the present embodiment, however, a plurality of objects can be displayed on the display unit 30 across a plurality of layers via an image with a transmittance other than 0%, and contact to an object in any layer can be detected. Therefore, according to the tactile sensation providing device 1 of the present embodiment, even if the area of the display unit 30 and the touch sensor 40 is small, the area can be used effectively.

In the present embodiment, the display/tactile sensation control unit 10 sets a tactile sensation based on pixel data specified by the application execution unit 20 and tactile sensation control information added to the pixel data. In greater detail, in the present embodiment, the display/tactile sensation control unit 10 sets the tactile sensation provided by the tactile sensation providing unit 50 for a "pixel" in the image displayed on the display unit 30. In other words, in the present embodiment, when displaying an object or the like as an image on the display unit 30, the tactile sensation that is provided is set in association with the image for each pixel in the image.

Accordingly, in the present embodiment, the control unit of the present invention is configured to include the display/tactile sensation control unit 10.

Based on the above-described tactile sensation setting, the display/tactile sensation control unit 10 controls the tactile sensation providing unit 50 to generate a vibration with a predetermined pattern in accordance with predetermined conditions. For example, when the touch sensor 40 detects contact at a position corresponding to a region in an image of a predetermined object or the like displayed on the display unit 30, the display/tactile sensation control unit 10 performs control to execute a predetermined process allocated to the image and controls the tactile sensation providing unit 50 to provide the tactile sensation set for the pixel in the image to a contacting object in contact with the touch face of the touch sensor 40.

In greater detail, in the present embodiment, when the touch sensor 40 detects contact at a position corresponding to an image displayed in the display unit 30 in a layer for which a tactile sensation is set, the display/tactile sensation control unit 10 preferably performs control to execute a process allocated to the image and controls the tactile sensation providing unit 50 to provide the tactile sensation set for the layer.

In other words, upon the touch sensor 40 detecting contact at a position corresponding to a pixel in the image of an object or the like, the display/tactile sensation control unit 10 performs control to execute a predetermined process allocated to the pixel. In this context, a "predetermined process" may, for example, be a process to launch an application upon contact to a position corresponding to the image of an icon for the application. Alternatively, a "predetermined process" may, for example, be a process to display, on the display unit 30, a character corresponding to a key or the like upon contact to a position corresponding to the image of an object of the key or the like. Additionally, the display/tactile sensation control unit 10 controls the tactile sensation providing unit 50 to provide the tactile sensation set for the "pixel" to the contacting object in contact with the touch face of the touch sensor 30.

The tactile sensation providing device 1 according to the present embodiment preferably distinguishes between execution of different processes in accordance with the state of the contact when the operator performs a contact operation on the touch sensor 40. In other words, in accordance with the state of contact detected by the touch sensor 40, the display/tactile sensation control unit 10 preferably performs control to distinguish between execution of a plurality of processes allocated to a pixel in the image displayed on the display unit 30. For example, the display/tactile sensation control unit 10 performs control to distinguish between execution of different processes when the touch sensor 40 detects contact by a single tap and contact by a double tap. The display/tactile sensation control unit 10 can also, for example, perform control to distinguish between execution of different processes when the touch sensor 40 detects contact by a normal slide operation and contact by a flicking operation that is quicker than a slide operation.

In order to avoid an erroneous operation and provide a realistic sense of operation (tactile sensation), the tactile sensation providing device 1 according to the present embodiment preferably does not execute a predetermined process and does not provide a tactile sensation when the operator simply brushes (contacts) the touch sensor 40 extremely lightly at a position corresponding to an object. In the present embodiment, the tactile sensation providing device 1 preferably executes a predetermined process and provides a tactile sensation only when the operator is in a state of contact with the touch sensor 40 at a position corresponding to an object and data based on pressure detected by the pressure detection unit 60 satisfies a predetermined standard.

In other words, while the touch sensor 40 detects contact at a position corresponding to a pixel in an image of an object or the like, the display/tactile sensation control unit 10 preferably performs control to execute a predetermined process allocated to the pixel when data based on pressure detected by the pressure detection unit 60 satisfies a standard set for the pixel. Additionally, the display/tactile sensation control unit 10 controls the tactile sensation providing unit 50 to provide the tactile sensation set for the pixel.

Furthermore, the tactile sensation providing device 1 according to the present embodiment preferably distinguishes between execution of different processes in accordance with data based on pressure detected by the pressure detection unit 60 when the operator performs a contact operation on the touch sensor 40. In other words, the tactile sensation providing device 1 can, for example, distinguish between execution of different processes when the operator presses the touch sensor 40 at a position corresponding to the same object with a first level of force and with a second level of force stronger than the first level of force.

In this case, the display/tactile sensation control unit 10 performs control to set a predetermined standard for the tactile sensation providing unit 50 to provide a tactile sensation for the pixel in an image of an object or the like at a plurality of levels. While the touch sensor 40 detects contact at a position corresponding to the pixel, when data based on pressure detected by the pressure detection unit 60 satisfies one of the plurality of levels of the standard for the pixel, the display/tactile sensation control unit 10 distinguishes, in accordance with the satisfied level of the standard, between execution of a plurality of predetermined processes allocated to the pixel.

When the display unit 30 displays an image across a plurality of layers, the tactile sensation providing device 1 according to the present embodiment can distinguish the layer contacted by the operator in accordance with the state of the contact when the operator performs a contact operation on the touch sensor 40. In other words, when the display unit 30 displays an image across a plurality of layers, the display/tactile sensation control unit 10, in accordance with the state of the contact detected by the touch sensor 40, can determine which layer, among the plurality of layers, contains the pixel to which the position of the contact corresponds.

For example, the display/tactile sensation control unit 10 can perform control to distinguish between execution of a plurality of processes when the touch sensor 40 detects contact by a single tap and contact by a double tap, determining that such contact is for different layers. The display/tactile sensation control unit 10 can also, for example, perform control to distinguish between execution of different processes when the touch sensor 40 detects contact by a normal slide operation and contact by a flicking operation that is quicker than a slide operation, determining that such contact is for different layers.

Furthermore, the tactile sensation providing device 1 according to the present embodiment can distinguish the layer contacted by the operator in accordance with data based on pressure detected by the pressure detection unit 60 upon the operator pressing the touch sensor 40. In other words, when the display unit 30 displays an image across a plurality of layers, then in accordance with the data based on pressure detected by the pressure detection unit 60, the display/tactile sensation control unit 10 can determine which layer, among the plurality of layers, contains the pixel to which the position of the contact on the touch sensor 30 corresponds.

In this case, the display/tactile sensation control unit 10 starts a predetermined process and sets the standard for the tactile sensation providing unit 50 to provide a tactile sensation for each layer in which pixels exist. In this case, for example, the display/tactile sensation control unit 10 can set a standard to be satisfied by data based on pressure at a plurality of levels, establishing settings such that as the level of the standard satisfied by data based on pressure detected by the pressure detection unit 60 is greater, the level corresponds to contact on a lower layer. While the touch sensor 40 detects contact at a position corresponding to a pixel in an image displayed in the display unit 30 in a layer for which a tactile sensation is set, the display/tactile sensation control unit 10 performs control to execute a process allocated to the pixel when the data based on pressure detected by the pressure detection unit 60 satisfies the standard set for the pixel displayed in the layer. Additionally, the display/tactile sensation control unit 10 controls the tactile sensation providing unit 50 to provide the tactile sensation set for the pixel displayed in the layer. Note that in this case, the display/tactile sensation control unit 10 notifies the application execution unit 20, at an appropriate time, of information such as information on the position at which the touch sensor 40 detected contact, the data based on pressure detected by the pressure detection unit 60, and the like.

Figure 2B:
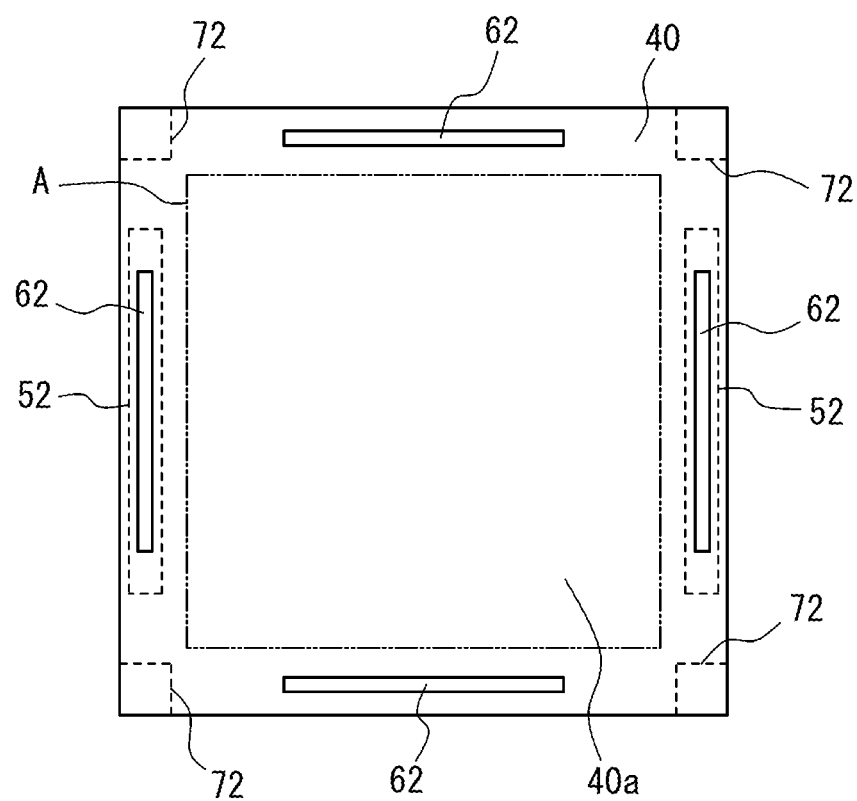

FIG. 2 illustrates an exemplary housing structure, focusing on the display unit 30, touch sensor 40, tactile sensation providing unit 50, and pressure detection unit 60 within the tactile sensation providing device 1 illustrated in FIG. 1. FIG. 2(A) is a cross-sectional diagram of the main parts, and FIG. 2(B) is a plan view of the main parts. The display unit 30 is held and stored within a housing 71. The touch sensor 40 is held above the display unit 30 via insulators 72 made from an elastic member. In the tactile sensation providing device 1 according to the present embodiment, the display unit 30 and the touch sensor 40 are rectangular in plan view. The touch sensor 40 and the display unit 30 may, however, be a shape in accordance with conditions such as the configuration of the tactile sensation providing device 1. In the tactile sensation providing device 1, the touch sensor 40 is held above the display unit 30 via four insulators 72 provided respectively at the four corners, away from a display region A of the display unit 30 illustrated in FIG. 2(B) by phantom lines.

In the housing 71, an upper cover 73 is provided so as to cover a surface region of the touch sensor 40 away from the display region of the display unit 30. An insulator 74 made from an elastic member is provided between the upper cover 73 and the touch sensor 40. The touch sensor 40 illustrated in FIG. 2 has a surface member configured for example with a transparent film or glass, which includes a touch face 40a, and has a rear face member configured with glass or acryl. The touch sensor 40 is configured so that when the touch face 40a is pressed, the pressed part bends (strains) slightly in response to the pressing force, or the entire structure bends slightly.

A strain gauge sensor 62 for detecting pressure applied to the touch sensor 40 is provided, via adhesive or the like, on the surface of the touch sensor 40 near each side covered by the upper cover 73. Furthermore, a piezoelectric vibrator 52 for vibrating the touch sensor 40 is provided, via adhesive or the like, near each of two opposing sides on the rear face of the touch sensor 40. In other words, in the tactile sensation providing device 1 illustrated in FIG. 2, the pressure detection unit 60 in FIG. 1 is configured using four strain gauge sensors 62, and the tactile sensation providing unit 50 in FIG. 1 is configured using two piezoelectric vibrators 52. The tactile sensation providing unit 50 vibrates the touch face 40a by vibrating the touch sensor 40. Note that the housing 71, upper cover 73, and insulators 74 illustrated in FIG. 2(A) are omitted from FIG. 2(B).

The following describes the information that pertains to control of the tactile sensation (referred to below as "tactile sensation control information" as appropriate) and is added to image data supplied by an application used in the tactile sensation providing device 1 according to the present embodiment.

FIG. 3 illustrates an example of a configuration in which tactile sensation control information has been added to pixel data of a resource for display. In the present embodiment, as described above, an image can be displayed in the display unit across a plurality of layers, and the tactile sensation provided in each of the plurality of layers is set pixel by pixel. In FIG. 3(A), to simplify the explanation, the plurality of layers when displaying an image in the display unit 30 consists of three layers: an upper layer, middle layer, and lower layer. The display of an image across a plurality of layers in the present embodiment is not, however, limited to three layers and may be any number of layers, such as four or more layers.

As illustrated in FIG. 3(A), the upper, middle, and lower layers each include information indicating the start of data (FB) and information indicating the end of data (EB). In other words, the data for each layer begins at FB and ends at EB. In each layer, between FB and EB, pixel data corresponding to the number of pixels for displaying an image on the display unit 30 is included. For example, when the resolution of the display unit 30 is QVGA, the amount of pixel data included corresponds to 320×240 pixels. In FIG. 3(A), only a portion of such a plurality of pixel data is shown.

FIG. 3(B) illustrates how tactile sensation control information is added to pixel data for each pixel in each layer. In FIG. 3(B), as an example, the pixel data and tactile sensation control information corresponding to one pixel included in the upper layer are shown, yet the same holds for the other pixels included in the upper layer and for the other pixels included in the other layers.

As illustrated in FIG. 3(B), the following information, for example, is included in rendering data and in tactile sensation control information that correspond to one pixel included in a layer.

(1) R

Information indicating the red component of the pixel.

(2) G

Information indicating the green component of the pixel.

(3) B

Information indicating the blue component of the pixel.

(4) Transmission

Information indicating the transmittance of the pixel, which can for example be used as information indicating the alpha channel or the like.

(5) Tactile sensation control information

Information for setting the tactile sensation provided when contact is detected on the touch sensor 40 at a position corresponding to the pixel.

The information from (1) to (4) prescribes one pixel among the pixels in the entire screen of each layer. Accordingly, by prescribing the above information for all of the pixels in each layer, the entire image for one screen formed by a variety of background images, objects, or the like is prescribed, including transparent portions (where no image is displayed) in each layer.

FIG. 3(C) illustrates the content of (5) tactile sensation control information in the pixels of each layer in detail. In FIG. 3(C), the content of the tactile sensation control information for one pixel in the upper layer is described as an example. However, even if the content of information differs for other layers or other pixels, the structure of the information is similar. As illustrated in FIG. 3(C), information such as the following is included in the tactile sensation control information of each layer.

(1) Tactile Sensation Activation Flag

A flag indicating whether to provide a tactile sensation for the layer (for example, if the flag is "ON", a predetermined tactile sensation is provided in response to contact corresponding to the layer, whereas if the flag is "OFF", no tactile sensation is provided even if contact corresponding to the layer is detected).

(2) Lower Layer Control Flag

A flag indicating whether, when an image is displayed in the display unit 30 across a plurality of layers, contact to a layer below the corresponding layer is permitted (for example, if the flag is "ON", contact to a layer below the corresponding layer is detected, whereas if the flag is "OFF", contact to a layer below the corresponding layer is not detected).

(3) Click Sensation Threshold

A threshold for data based on pressure serving as a standard for recognizing a pressure operation corresponding to the layer and for providing a click sensation (in other words, if the data based on pressure detected by the pressure detection unit 60, due to the operator pressing the touch sensor 40, reaches the click sensation threshold, the tactile sensation providing device 1 provides a click sensation).

(4) Release Sensation Threshold

A threshold for data based on pressure serving as a standard for recognizing that a pressure operation corresponding to the layer has been released and for providing a release sensation (in other words, if the pressure on the touch sensor 40 by the operator weakens, and the data based on pressure detected by the pressure detection unit 60 falls below the release sensation threshold, the tactile sensation providing device 1 provides a release sensation (even if contact is still being detected)).

(5) Vibration Waveform

May be actual vibration waveform data used when the tactile sensation providing unit 50 provides the tactile sensation set for the layer, a vibration pattern prepared in advance, or the like (in other words, based on the information on the vibration waveform, the display/tactile sensation control unit 10 can control the tactile sensation providing unit 50 to provide a variety of predetermined tactile sensations).

(6) Number of Levels of Tactile Sensation Provision

When, for example, a standard to be satisfied by data based on pressure is set at a plurality of levels and pressure is detected by level, or different contact is detected in accordance with the state of contact, this number indicates how many levels of different pressure or contact are distinguished and detected for provision of a corresponding tactile sensation.

A "click sensation" is the tactile sensation when a key buckles, such as the tactile sensation provided when a key or button formed by a mechanical push-button switch is pressed. A "release sensation" is the tactile sensation provided when a buckled key returns to its original state, such as the tactile sensation obtained when weakening the pressing force on a depressed key or button formed by a mechanical push-button switch.

In this way, by adding tactile sensation control information for each pixel, the tactile sensation providing device 1 according to the present embodiment can distinguish between detection of different contact or pressure corresponding to each pixel and provide a different tactile sensation for each pixel in response to the detection. As described above, by including the (1) tactile sensation activation flag in the tactile sensation control information, the tactile sensation providing device 1 according to the present embodiment can also freely set whether to execute a tactile sensation providing process for any layer. Furthermore, by including the (2) lower layer control flag in the tactile sensation control information, the tactile sensation providing device 1 according to the present embodiment can freely set whether to execute a tactile sensation providing process for layers lower than the corresponding layer. In other words, in the tactile sensation providing device 1, the display/tactile sensation control unit 10 sets, for one layer among the plurality of layers, provision of a tactile sensation set for a lower layer than the one layer to be valid or invalid.

In a typical user interface (UI), the layout of objects is often changed, or the configuration of the UI is often changed, upon launching of an application or upon the start of a process based on an application in response to a key press, for example. Accordingly, the display/tactile sensation control unit 10 preferably sets the tactile sensation to be provided for each pixel upon the occurrence of a predetermined event, such as upon launching of an application or upon the start of a process based on an application in response to a key press as described above. In other words, in the tactile sensation providing device 1, based on the occurrence of a predetermined event, the display/tactile sensation control unit 10 preferably controls the display unit 30 to change the image that is displayed and performs control to set the tactile sensation provided by the tactile sensation providing unit 50 for a pixel in the image.

In this way, with the tactile sensation providing device 1 according to the present embodiment, the tactile sensation based on the tactile sensation control information can be set pixel by pixel. Accordingly, with the tactile sensation providing device 1 according to the present embodiment, the tactile sensation provided in accordance with contact on the touch sensor 40 can be set with a high degree of freedom in correspondence with an image displayed on the display unit 30. Even if objects or the like are displayed on the display unit in overlap across a plurality of layers, merely controlling the display always ends up limiting detection of contact or pressure and the provision of a tactile sensation in accordance with the detection to 2D control. By contrast, according to the tactile sensation providing device 1 of the present embodiment, detection of contact or pressure and the provision of a tactile sensation in accordance with the detection is performed layer by layer, thus allowing for 3D control.

Next, operations by the tactile sensation providing device 1 of the present embodiment are explained using a specific example. FIG. 4 illustrates an image with three superimposed layers on the display unit 30 of the tactile sensation providing device 1. In the following explanation, the display on the display unit 30 of an image that is actually superimposed is illustrated, for the sake of explanation, as being separated layer by layer. Furthermore, in the following explanation, contact or pressure detected by the touch sensor 40 at a position corresponding to a region of an object displayed on the display unit 30 is indicated simply as "contact or pressure on an object" as appropriate.

In FIG. 4, the layer shown in (A) represents the lowest layer and is referred to simply as the "lower layer". (B) represents the closest overlapping layer higher than the above-described lower layer and is referred to simply as the "middle layer". (C) represents the closest overlapping layer higher than the above-described middle layer and is referred to simply as the "upper layer". In the present example, in order to simplify the explanation, the display on the display unit 30 is described as being formed by three layers, yet in the tactile sensation providing device 1 according to the present embodiment, any number of layers may be used.

Figure 4C:
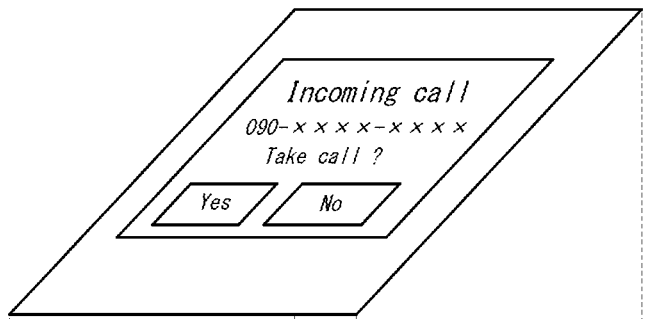
FIG. 4 illustrates an example of operations by the tactile sensation providing device according to an embodiment of the present invention.
Figure 4B:
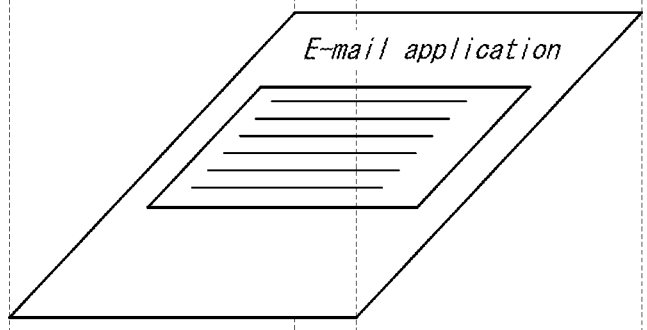
Figure 4A:
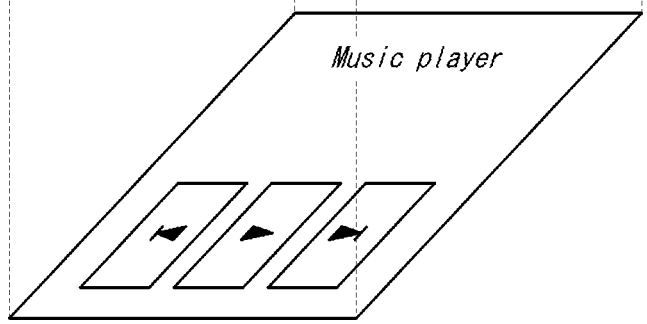

As illustrated in FIG. 4(A), in the lower layer, a background color is displayed as an image by execution of a music player application, or an object for a key or the like for executing a process based on an application is displayed as an image, for example. As illustrated in FIG. 4(B), a character editing screen for example is displayed in the middle layer by execution of an e-mail composition application. Furthermore, as illustrated in FIG. 4(C), for example at the time of an incoming telephone call, a pop-up display object is displayed as an image in the upper layer to cause the operator to select whether to take the call.

As illustrated in FIG. 4, when setting the tactile sensation provided in correspondence with an image of an object or the like displayed on the display unit 30, the tactile sensation providing device 1 according to the present embodiment can set the tactile sensation provided "for each pixel" in the image. Accordingly, for example in the user interface of the music player shown in FIG. 4(A), settings can be established to provide different tactile sensations for each of the three objects representing buttons as an image.

For example, a setting can also be established to provide the above-described click sensation for the three objects shown in FIG. 4(A). Additionally, for the edge portions of the three objects shown in FIG. 4(A), a setting can be established to provide a tactile sensation indicating the edge portion of a button in response to weaker pressure than when the click sensation is provided. Other possibilities include, for example, establishing a setting to provide a tactile sensation for pixels at predetermined intervals within a large set of pixels forming an image of a large object, so as to provide a tactile sensation of tracing over a surface rough to the touch in response to a slide operation by the operator.

In this way, according to the present embodiment, the tactile sensation provided in correspondence with an image rendered on the display unit can be set with an extremely high degree of freedom.

Note that in the upper layer in FIG. 4(C), a pop-up display is illustrated, yet during normal operation, when no pop-up display has been performed, nothing is displayed for the image in the layer, as in FIG. 5(C). Furthermore, in the present example, the objects displayed in each layer are subjected to transmissive display, as illustrated in FIG. 4. In other words, even if objects in the plurality of layers are displayed in positional overlap, the object displayed in each layer is displayed by being transmitted through the other objects. Such transmissive display can be achieved by setting the transmittance or the like in the information on (4) transmission described in FIG. 3(B). As illustrated in FIG. 5(C), for any layer in which no object is displayed, transmissive display is achieved with a transparent color or the like.

The tactile sensation providing device 1 in the present example can execute a multitasking process for simultaneous execution of a plurality of applications and can distinguish between detection of an operation by the operator for each layer by displaying each application in a different layer. Furthermore, in the present example, operations by pressure or contact can be distinguished into various levels and detected as different operations. In other words, in the present example, the tactile sensation providing device 1 can detect pressure on different layers, or can detect different levels of pressure within one predetermined layer, in accordance with the level of the standard satisfied by data based on pressure when the operator performs a contact operation on the touch sensor 40. Furthermore, in the present example, the tactile sensation providing device 1 can detect contact on different layers, or can detect different levels of contact within one predetermined layer, in accordance with the state of contact when the operator performs a contact operation on the touch sensor 40.

FIG. 5 shows a normal display when, with the layer display in FIG. 4, the e-mail composition application is also running while the music player application is running in the tactile sensation providing device 1. A normal display refers to the display when there is no pop-up display on the display unit 30 to attract the operator's attention.

As shown in FIG. 5(C), in the case when the upper layer has no pop-up display, contact on the upper layer is not detected, nor is a tactile sensation provided, since the (1) tactile sensation activation flag described in FIG. 3(C) is OFF. Since the (2) lower layer control flag is ON, even though no contact is detected in the upper layer, contact in layers lower than the upper layer is detected. Note that since no contact is detected in the upper layer, the (6) number of levels of tactile sensation provision is set to zero.

Next, as shown in FIG. 5(B), in the middle layer in the case when the upper layer has no pop-up display, contact on the middle layer is detected, and a tactile sensation is provided in accordance with the detection, since the (1) tactile sensation activation flag is ON. In other words, contact is detected for a location at which an object is displayed by the e-mail composition application, and upon detection of the contact, a predetermined process is executed, and the tactile sensation set for the pixel at the corresponding position is provided. Since the (2) lower layer control flag is ON, while detecting contact in the middle layer, contact in the layer even lower than the middle layer is also detected. Note that the (6) number of levels of tactile sensation provision is set to one when detecting contact in the middle layer.

Furthermore, as shown in FIG. 5(A), in the lower layer in the case when the upper layer has no pop-up display, contact on the lower layer is detected, and a tactile sensation is provided in accordance with the detection, since the (1) tactile sensation activation flag is ON. In other words, contact is detected for a location at which an object for a key or the like is displayed at the bottom of the screen, and a corresponding tactile sensation is provided in accordance with the detection. Note that since contact or pressure at two levels is detected for the objects in the lower layer, the (6) number of levels of tactile sensation provision is set to two. In other words, in the present example, contact or pressure at two levels is detected by distinguishing between pressure with a multilevel standard to be satisfied by data based on pressure on the lower layer, or by distinguishing between states of contact or pressure. In the present example, as shown in FIG. 5(B), since contact or pressure at the first level is already detected in the middle layer, contact or pressure is actually detected at the second level and the third level in the lower layer shown in FIG. 5(C).

Accordingly, by contact or pressure at the first level, the operator can perform an operation on the e-mail composition application in the middle layer. Furthermore, by contact or pressure at the second and third levels, the operator can perform operations on the music player application in the lower layer. In this case, processes can be allocated so that, for example, by detecting contact or pressure at the second level, the next track in the music player is played back, and by detecting contact or pressure at the third level, the playback volume of the music player is raised.

Next, it is assumed that a telephone application provided in the tactile sensation providing device 1 receives a telephone call, and therefore due to interrupt processing by the telephone application, an event occurs to inquire whether to take the incoming call.

Figure 6C:
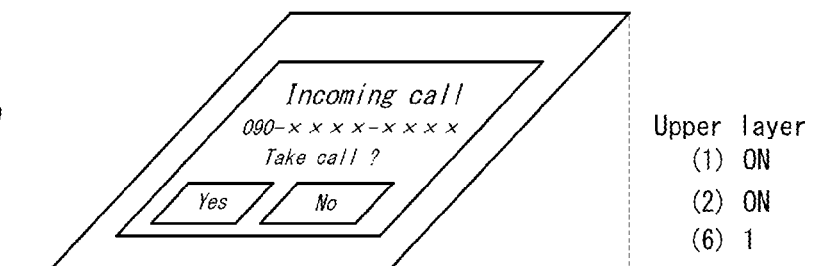
FIG. 6 illustrates an example of operations by the tactile sensation providing device according to an embodiment of the present invention.

Upon the occurrence of such an event, a new display is configured on the display unit 30 by the pixel data from (1) to (4) described in FIG. 3(B), and the setting for the display/tactile sensation control unit 10 to control the tactile sensation providing unit 50 is also changed pixel by pixel with the (5) tactile sensation control information. In the case of this example, in order to check with the operator as to whether to take an incoming call, the pop-up display as illustrated in FIG. 6(C) is performed in the upper layer. The tactile sensation providing device 1 executes a process to take an incoming call in response to detection of contact to the "yes" portion of an object indicating "incoming call" in the upper layer illustrated in FIG. 6(C). In other words, the operator can take an incoming call and talk by contacting, with a finger or the like, the "yes" portion of the object indicating "incoming call" displayed in the upper layer.

FIG. 6 illustrates a pop-up displayed by a layer on the display unit 30 in the tactile sensation providing device 1 to indicate an incoming call during the execution of other applications in the middle layer and the lower layer.

As illustrated in FIG. 6(C), along with change of display, in the upper layer when performing the pop-up display, the (1) tactile sensation activation flag is set to ON, so that contact to the upper layer is detected, and a tactile sensation in accordance with the detection is provided. Since the setting for the (2) lower layer control flag remains ON, contact in layers lower than the upper layer is detected. Note that since contact or pressure at one level is detected for the objects in the upper layer, the (6) number of levels of tactile sensation provision is set to one. Accordingly, contact at the first level on the object in the pop-up displayed in the upper layer is detected, a tactile sensation in accordance with the detected contact is provided, and the incoming call is taken.

Figure 6B:
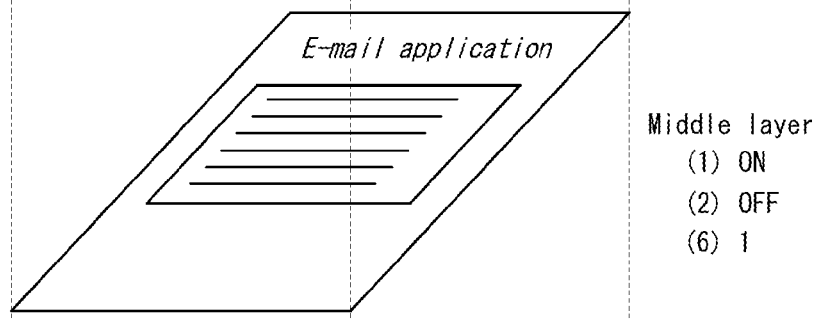
Figure 6A:
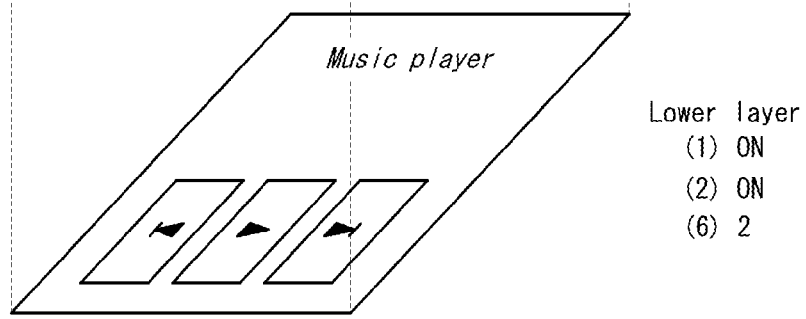

As illustrated in FIG. 6(B), since the (1) tactile sensation activation flag is still ON in the middle layer, contact on the middle layer is detected, and a tactile sensation in accordance with the detection is provided. Accordingly, since contact is detected on an object based on the e-mail composition application displayed in the middle layer, the operator can perform an operation on the e-mail composition application even while the pop-up display remains in the upper layer. In order to perform this operation on the middle layer, the operator can simply provide contact or pressure at the second level. As illustrated in FIG. 6(B), since the (2) lower layer control flag is OFF, even if contact is detected in the middle layer, contact on layers lower than the middle layer is not detected. Therefore, as illustrated in FIG. 6(A), even though the (1) tactile sensation activation flag in the lower layer is ON, contact to the lower layer is no longer detected, and a tactile sensation corresponding to the lower layer is no longer provided. Accordingly, as illustrated in FIG. 6, while the pop-up is displayed in the upper layer, the operator can no longer perform an operation on the music player application.

In this way, according to the tactile sensation providing device 1, when a telephone call is received during simultaneous execution of two applications, i.e. a music player application and an e-mail composition application, operation for the music player application can be made invalid while keeping operation for the e-mail composition application valid.

Next, operations by the tactile sensation providing device 1 of the present embodiment are explained further using another specific example. FIG. 7 illustrates another example of operations by the tactile sensation providing device 1 when a telephone call is received during the regular display described in FIG. 5. In other words, in the above-described example, operations by the tactile sensation providing device 1 transitioned from the state illustrated in FIG. 5 to the state illustrated in FIG. 6, whereas in the following example, operations transition from the state illustrated in FIG. 5 to the state illustrated in FIG. 7.

FIG. 7 illustrates a pop-up displayed by a layer on the display unit 30 in the tactile sensation providing device 1 to indicate an incoming call during the execution of other applications in the middle layer and the lower layer.

Figure 7C:
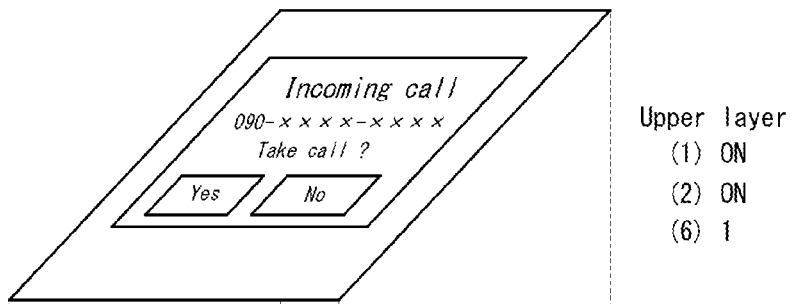
FIG. 7 illustrates another example of operations by the tactile sensation providing device according to an embodiment of the present invention.

As illustrated in FIG. 7(C), along with change of display, in the upper layer when performing the pop-up display, the (1) tactile sensation activation flag is set to ON, so that contact to the upper layer is detected, and a tactile sensation in accordance with the detection is provided. Since the setting for the (2) lower layer control flag remains ON, contact in layers lower than the upper layer is detected. Note that since contact or pressure at one level is detected for the objects in the upper layer, the (6) number of levels of tactile sensation provision is set to one. Accordingly, contact at the first level on the object in the pop-up displayed in the upper layer is detected, a tactile sensation in accordance with the detected contact is provided, and the incoming call is taken.

Figure 7B:
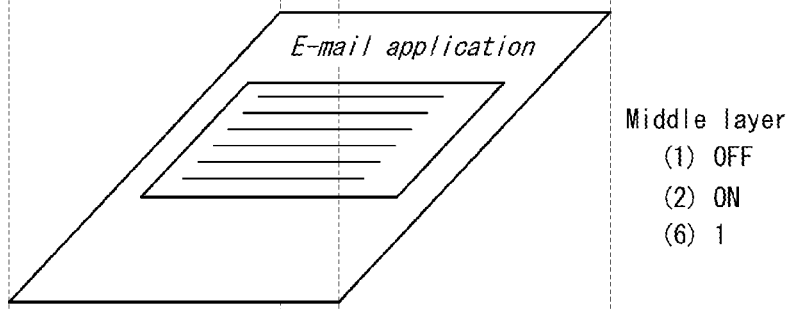

On the other hand, as illustrated in FIG. 7(B), since the (1) tactile sensation activation flag in the middle layer is OFF, contact to the middle layer is no longer detected, and a tactile sensation is no longer provided. Accordingly, contact on an object based on the e-mail composition application displayed in the middle layer is no longer detected, and hence the operator can no longer perform an operation on the e-mail application. As illustrated in FIG. 7(B), however, since the (2) lower layer control flag is ON, even though contact to the middle layer is not detected, contact on layers lower than the middle layer is detected.

Figure 7A:
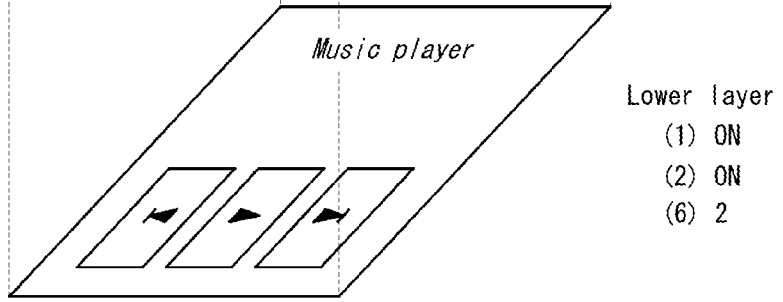

As illustrated in FIG. 7(A), since the (1) tactile sensation activation flag is ON in the lower layer, contact on the lower layer is detected, and a tactile sensation in accordance with the detection is provided. Note that since contact or pressure at two levels is detected for the objects in the lower layer, the (6) number of levels of tactile sensation provision is set to two. In other words, in the present example, two types of contact or pressure are detected by distinguishing between pressure with a multilevel standard to be satisfied by data based on pressure on the lower layer, or by distinguishing between states of contact or pressure. In the present example, as shown in FIG. 7(C), since contact or pressure at the first level is already detected in the upper layer, contact or pressure is actually detected at the second level and the third level in the lower layer shown in FIG. 7(C). In this case, processes can be allocated so that, for example, by detecting contact or pressure at the second level, the previous track in the music player is played back, and by detecting contact or pressure at the third level, the playback volume of the music player is lowered.

In this way, according to the tactile sensation providing device 1, when a phone call is received during simultaneous execution of two applications, i.e. a music player application and an e-mail composition application, operation for the music player application, for example, can be kept valid while making operation for the e-mail composition application invalid.

Next, operations by the tactile sensation providing device 1 of the present embodiment are explained further using yet another specific example. FIG. 8 illustrates another example of operations by the tactile sensation providing device 1 when a telephone call is received during the regular display described in FIG. 5. In other words, in the example described below, operations of the tactile sensation providing device 1 transition from the state illustrated in FIG. 5 to the state illustrated in FIG. 8.

FIG. 8 illustrates a pop-up displayed by a layer on the display unit 30 in the tactile sensation providing device 1 to indicate an incoming call during the execution of other applications in the middle layer and the lower layer.

Figure 8C:
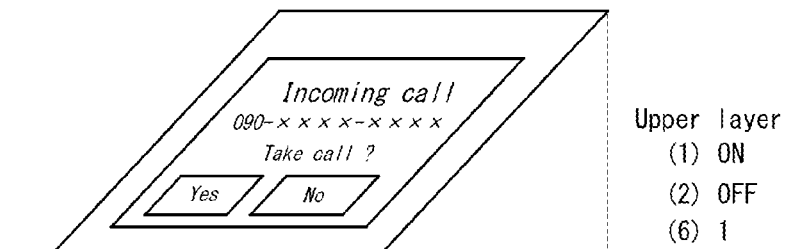
FIG. 8 illustrates yet another example of operations by the tactile sensation providing device according to an embodiment of the present invention.
Figure 8B:
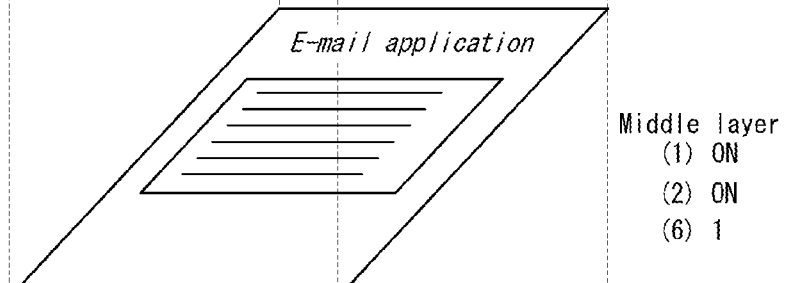
Figure 8A:
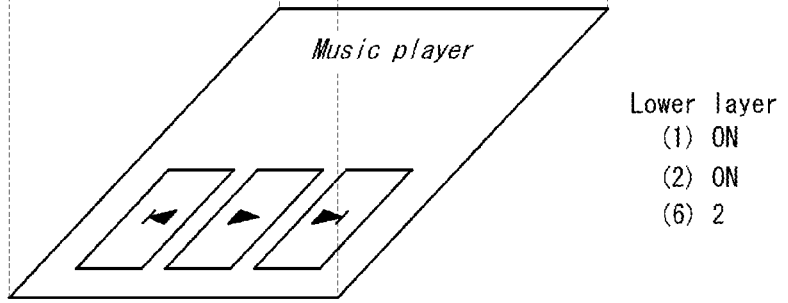

As illustrated in FIG. 8(C), along with change of display, in the upper layer when performing the pop-up display, the (1) tactile sensation activation flag is set to ON, so that contact to the upper layer is detected, and a tactile sensation in accordance with the detection is provided. On the other hand, the (2) lower layer control flag is set to OFF, and therefore contact to layers lower than the upper layer is no longer detected, and a tactile sensation corresponding to layers lower than the upper layer is no longer provided. Accordingly, in this state, contact at the first level on the object in the pop-up displayed in the upper layer is detected, a tactile sensation in accordance with the detection of contact is provided, and the incoming call is taken, yet contact is no longer detected in the middle layer and the lower layer. In the present example, even though the (1) tactile sensation activation flag is ON in the middle layer and the lower layer, contact is not detected, and a tactile sensation corresponding to these layers is no longer provided.

In this way, according to the tactile sensation providing device 1, when a phone call is received during simultaneous execution of two applications, i.e. a music player application and an e-mail composition application, both operation for the e-mail composition application and operation for the music player application can be made invalid. In this case, only contact or pressure on the pop-up display in the upper layer is detected.

According to the tactile sensation providing device 1 of the present embodiment, for each pixel forming an image of an object displayed on the display unit 30, the provided tactile sensation can be set. Therefore, as compared to a known feedback method, a tactile sensation can be set and provided with a far higher degree of freedom. Furthermore, as illustrated in the above examples, according to the tactile sensation providing device 1 of the present embodiment, by displaying an image across layers on the display unit 30 and having the touch sensor 40 detect contact to the image in each layer, a tactile sensation can be provided for each layer. Therefore, according to the tactile sensation providing device 1 of the present embodiment, detection of contact or pressure and the provision of a tactile sensation in accordance with the detection is performed layer by layer, allowing for 3D control of the tactile sensation. Hence, the touch sensor 40 and the display unit 30 can be used effectively.

The tactile sensation that the tactile sensation providing unit 50 provides to a pressing object, in accordance with contact or pressure on the touch sensor 40 corresponding to a location at which an object for a key or the like is displayed on the display unit 30, may be a realistic tactile sensation like the above-described click sensation. In order to provide a realistic click sensation to the operator, the tactile sensation providing device 1 stimulates the operator's sense of touch while stimulating the sense of pressure by performing a process such as the following. In other words, as a load is applied to the touch sensor 40, the tactile sensation providing device 1 stimulates the sense of pressure until the data based on pressure detected by the load detection unit 60 satisfies a standard for providing a tactile sensation (for example, a standard to be satisfied by data based on pressure of 1 N). Upon the data based on pressure satisfying the standard, the tactile sensation providing device 1 stimulates the sense of touch by driving the piezoelectric vibrators 52 with a predetermined drive signal to vibrate the touch face 40a. In this way, the tactile sensation providing device 1 can provide the operator with a click sensation similar to that obtained when pushing a button switch such as a push-button switch (push-type button switch). Therefore, the operator does not suffer a feeling of strangeness, since even when the object rendered at the upper portion of the touch sensor is a push-button switch, the operator can perform an operation on the touch sensor 40 while obtaining a realistic click sensation similar to that obtained when operating a push-button switch. Moreover, since the operator can perform an operation in conjunction with the perception of "having pressed" the touch sensor 11, an operation error caused by unintentional, light contact can be prevented.

The drive signal for providing the above-described click sensation, i.e. the fixed frequency, period (wavelength), waveform, and amplitude for stimulating the sense of touch can be set appropriately in accordance with the click sensation to be provided. For example, to provide a click sensation as representatively provided by a metal dome switch used in a mobile terminal, the tactile sensation providing unit 50 is driven by one period of a drive signal composed, for example, of a sine wave with a fixed frequency of 170 Hz. The tactile sensation providing unit 50 is driven with such a drive signal, and with the data based on pressure detected by the load detection unit 60 satisfying a predetermined standard, the touch face 40a is vibrated approximately 15 μm. As a result, the operator can be provided with a realistic click sensation as when clicking an actual key.

In the examples in the above-described embodiments, the tactile sensation providing device 1 does not provide a tactile sensation yet at the point when the touch sensor 40 detects contact, but rather provides a tactile sensation at the point when the data based on pressure detected by the pressure detection unit 60 satisfies a predetermined standard. However, a tactile sensation may be provided according to the present embodiment even by omitting detection of pressure by the pressure detection unit 60 and only detecting whether contact is made to the touch sensor 40 and the position of the contact. In this case, based on the fact that the touch sensor 40 has detected contact, the display/tactile sensation control unit 10 starts a predetermined process and provides a tactile sensation. Furthermore, in this case, since different processes cannot be allocated based on detection by level of the load, different processes are allocated in accordance with the state of the contact on the touch sensor 40. In other words, in this case, contact on different layers, or different levels of contact within one predetermined layer, is detected in accordance with the state of contact on the touch sensor 40.

Figure 9:
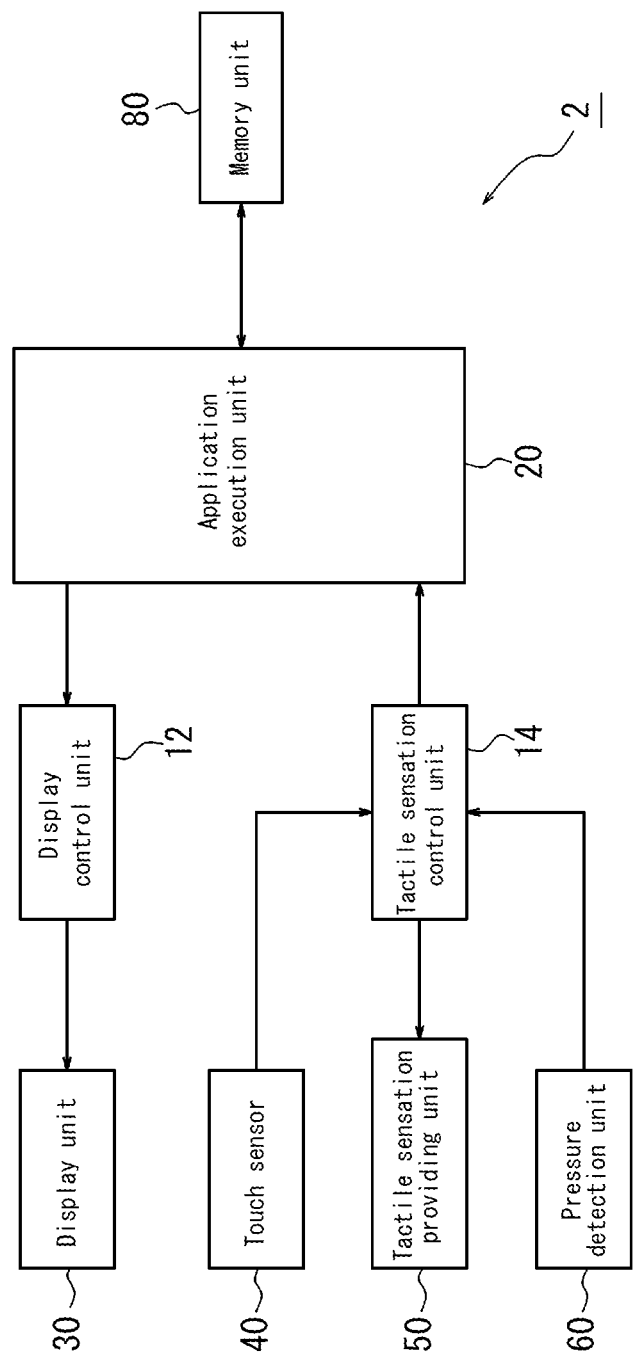
FIG. 9 is a block diagram schematically illustrating the configuration of a tactile sensation providing device according to a modification to the present invention.

The present invention is not limited only to the above embodiment, and a variety of modifications and changes may be made. For example, in the above-described embodiment, the display/tactile sensation control unit 10 has been described as being configured to control the display unit 30 and the tactile sensation providing unit 50, yet the present invention is not limited to this configuration. In accordance with design requirements, a variety of configurations may be adopted. For example, as illustrated in FIG. 9, a configuration may be adopted in which a display control unit 12 controls the display unit 30, and a tactile sensation control unit 14 controls the tactile sensation providing unit 50. In this case, the display control unit 12 controls the display unit 30 to display an image based on the pixel data from (1) to (4) illustrated in FIG. 3(B), and the tactile sensation control unit 14 controls the tactile sensation providing unit 50 to provide a predetermined tactile sensation based on the (5) tactile sensation control information illustrated in FIG. 3(B).

Furthermore, in the above-described embodiment, the display/tactile sensation control unit 10 and the application execution unit 20 have been described as separate functional units. The functions of the display/tactile sensation control unit 10 and the application execution unit 20 may, however, be combined within a single processor. Alternatively, a structure may be adopted in which one of the display/tactile sensation control unit 10 and the application execution unit 20 includes the other.

In the above embodiment, the touch sensor 40 is used to detect contact on the touch face of the touch sensor. Alternatively, a load sensor (pressure detection unit) may be used to determine that contact has been made when data based on pressure achieves a predetermined standard. Like the pressure detection unit 60 in the above-described embodiment, such a pressure detection unit can be structured using any number of strain gauge sensors or the like.

The tactile sensation providing unit may be configured using any number of piezoelectric vibrators, using a transparent piezoelectric element on the entire surface of the touch sensor, or by causing an eccentric motor to rotate once per period of a drive signal, as long as the eccentric motor can express vibration that presents a tactile sensation.

The tactile sensation providing device according to the present invention has been described as driving the pressure detection unit 60 when data based on pressure detected by the pressure detection unit 60 satisfies a predetermined standard for providing a tactile sensation. Stating that the data based on pressure satisfies a predetermined standard for providing a tactile sensation may refer to when data based on pressure has reached a predetermined standard value, to when data based on pressure has exceeded a predetermined standard value, or to when data corresponding to a standard value for providing a tactile sensation is output from the pressure detection unit 60.

REFERENCE SIGNS LIST

1: Tactile sensation providing device
10: Display/tactile sensation control unit
20: Application execution unit
30: Display unit
40: Touch sensor
40a: Touch face
50: Tactile sensation providing unit
52: Piezoelectric vibrator
60: Pressure detection unit
62: Strain gauge sensor
71: Housing
72: Insulator
73: Upper cover
74: Insulator
80: Memory unit

The invention claimed is:

1. A tactile sensation providing device comprising:
   a touch sensor;
   a tactile sensation providing unit configured to vibrate a touch face of the touch sensor;
   a display unit; and
   a control unit configured to control the display unit to display an image, wherein
   the control unit is further configured to perform control to set a tactile sensation provided by the tactile sensation providing unit for a pixel in the image, so that upon the touch sensor detecting contact at a position corresponding to the pixel, the control unit executes a predetermined process allocated to the pixel and controls the tactile sensation providing unit to provide the tactile sensation set for the pixel to a contacting object in contact with the touch face, and
   wherein when the display unit displays an image across a plurality of layers, the control unit sets, for a pixel in one layer among the plurality of layers, provision of a tactile sensation set for a lower layer than the one layer to be valid or invalid.

2. The tactile sensation providing device according to claim 1, wherein in accordance with a state of the contact detected by the touch sensor, the control unit distinguishes between execution of a plurality of predetermined processes allocated to the pixel.

3. The tactile sensation providing device according to claim 1, further comprising:
   a pressure detection unit configured to detect pressure on the touch face, wherein
   the control unit performs control to set a predetermined standard for the tactile sensation providing unit to provide a tactile sensation for the pixel, and while the touch sensor detects contact at a position corresponding to the pixel, when data based on pressure detected by the pressure detection unit satisfies the standard, the control unit executes the predetermined process allocated to the pixel and controls the tactile sensation providing unit to provide the tactile sensation set for the pixel.

4. The tactile sensation providing device according to claim 3, wherein the control unit performs control to set the predetermined standard for the tactile sensation providing unit to provide the tactile sensation for the pixel at a plurality of levels, and while the touch sensor detects contact at a position corresponding to the pixel, when data based on pressure detected by the pressure detection unit satisfies one of the plurality of levels of the standard, the control unit distinguishes, in accordance with the one of the plurality of levels of the standard that is satisfied, between execution of a plurality of predetermined processes allocated to the pixel.

5. The tactile sensation providing device according to claim 1, wherein, when the display unit displays the image across the plurality of layers, the control unit, in accordance with a state of the contact detected by the touch sensor, determines which layer, among the plurality of layers, contains the pixel to which the position of the contact corresponds.

6. The tactile sensation providing device according to claim 1, further comprising:
   a pressure detection unit configured to detect pressure on the touch face, wherein
   when the display unit displays the image across the plurality of layers, the control unit, in accordance with data based on pressure detected by the pressure detection unit, determines which layer, among the plurality of layers, contains the pixel to which the position of the contact corresponds.

7. The tactile sensation providing device according to claim 1, wherein based on occurrence of a predetermined event, the control unit controls the display unit to change the image that is displayed and performs control to set the tactile sensation provided by the tactile sensation providing unit for the pixel in the image.

\* \* \* \* \*